April 1, 1941. H. J. NICHOLS 2,237,108
INTERMITTENT MOTION MECHANISM
Filed Oct. 10, 1939  2 Sheets-Sheet 1

INVENTOR
Harry J. Nichols
BY
ATTORNEY

April 1, 1941. H. J. NICHOLS 2,237,108
INTERMITTENT MOTION MECHANISM
Filed Oct. 10, 1939  2 Sheets-Sheet 2
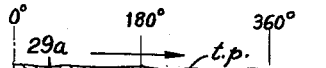
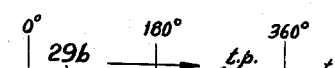
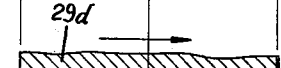
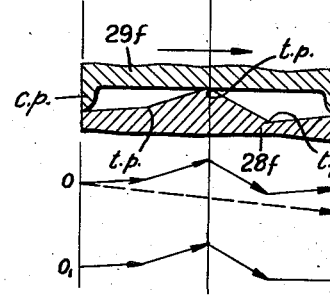

Patented Apr. 1, 1941

2,237,108

UNITED STATES PATENT OFFICE 2,237,108

INTERMITTENT MOTION MECHANISM

Harry J. Nichols, Binghamton, N. Y., assignor to International Business Machines Corporation, New York, N. Y., a corporation of New York Application October 10, 1939, Serial No. 298,751

9 Claims. (Cl. 74—426)

The present invention relates to motion producing means and more particularly to mechanism for producing intermittent motion.

The invention embodies novel means whereby continuous movement of rotation may be changed to intermittent movement of rotation whose intermittency can be controlled in one of a variety of desired manners.

More specifically, the device embodying the invention is provided for the purpose of changing the continuous motion of rotation of a worm into intermittent motion whose intermittency is controlled in a desired manner.

In the devices of the prior art, many mechanisms have been provided for producing intermittent motion. Such devices, however, have entailed the utilization of pawl and ratchet elements, friction ratchets, intermittent gearing, Geneva wheels and complicated cam devices, which devices do not have a continuous, positive drive, are subject to overthrow, do not have a continuous engagement of driving surfaces, lack versatility of motional cycles and are complicated and expensive.

In view of the above conditions prevailing in the prior art, one of the objects of the present invention is to provide a novel means for producing from continuous rotary motion any desired type of intermittent motion whereby the foregoing undesirable characteristics are eliminated.

Another object is to provide novel means for producing from a continuous rotary motion a desired intermittent motion which shall be simple and economical to construct and continuously positive in driving action.

Still another object is to provide novel means for producing intermittent motion wherein driving surfaces are continuously in engagement so that overthrow is completely avoided.

A further object is to provide novel means for producing intermittent motion which means have great versatility with respect to the motional cycle whereby any desired type of intermittent motion may be produced.

Another object is to provide novel means for producing intermittent motion whereby either overdrive or underdrive may be obtained as desired.

A further object is to provide a novel mechanism for producing intermittent motion from continuous rotary motion, comprising a continuously rotating element, and cam means for simultaneously superimposing thereon a motion of translation.

Still another object is to produce a novel mechanism for producing intermittent motion from continuous rotary motion, comprising a continuously rotating worm, and cam means for simultaneously producing axial movement of said worm.

Other objects of the invention will be pointed out in the following description and claims and illustrated in the accompaniy drawings, which disclose, by way of example, the principle of the invention and the best mode, which has been contemplated, of applying that principle.

In the drawings:

Figs. 3, 3a and 3b are diagrammatic views illustrating the method of operation of one embodiment of the invention.

Figs. 4, 4a, and 4b are diagrammatic views illustrating the method of operation of a slight modification of the embodiment as illustrated in Fig. 3.

Figs. 5, 5a, and 5b are diagrammatic views illustrating the method of operation of another modification of the invention.

Figs. 6, 6a and 6b are diagrammatic views illustrating the method of operation of still another embodiment of the invention.

Figs. 7, 7a, and 7b are diagrammatic views illustrating the method of operation of an embodiment of the invention for producing an overdrive.

Figs. 8, 8a, and 8b are diagrammatic views of a device generally similar to that of Figs. 7, 7a, and 7b but with a changed relative relationship of the respective parts.

Figs. 9, 9a, and 9b are diagrammatic views illustrating the method of operation of still another embodiment of the invention.

Figs. 10, 10a, and 10b are diagrammatic views illustrating the method of operation of a further embodiment of the invention.

Figure 1:
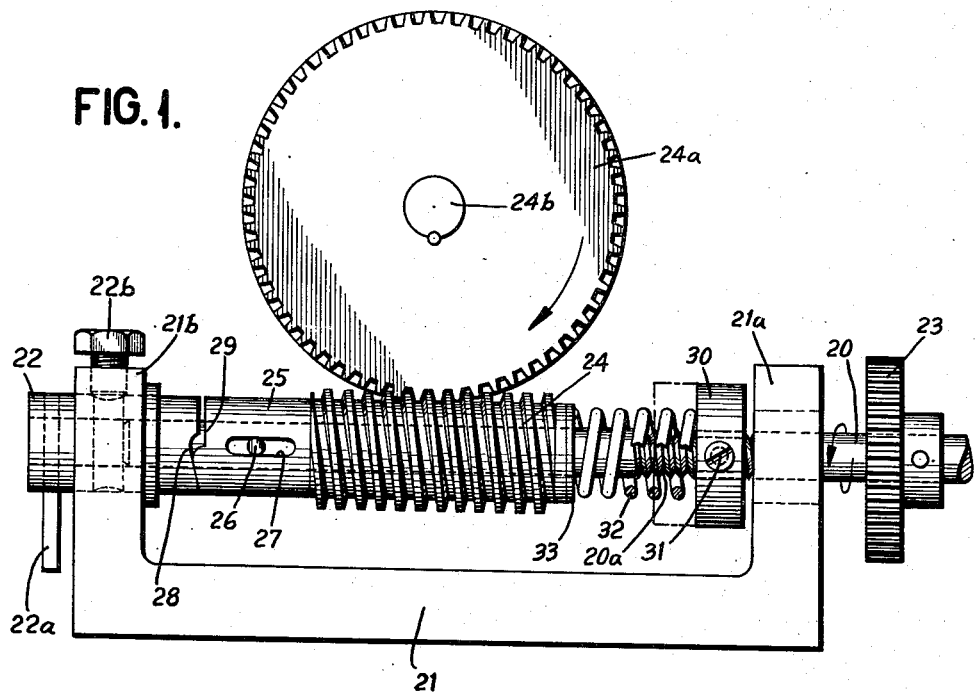
Fig. 1 is a side elevation illustrating diagrammatically the mechanical elements embodying the principle of operation of the present invention.

Referring to the drawings, and more particularly to Fig. 1, a rotatable shaft 20 is journaled at one end thereof in the leg 21a of base 21 and at the other end thereof in a hollow cylinder 22 adjustably mounted for rotation in a leg 21b of base 21. A drive means such as a gear 23 is attached to the shaft 20 whereby said shaft may be continuously rotated by any well known means utilized for rotating the element 23.

Novel means are now provided whereby the continuous, rotative movement of shaft 20 may be changed into a desired intermittent, rotative movement.

A worm 24 having an elongated sleeve or hub 25 extending coaxially therewith is rotatably mounted on the shaft 20. Means are now provided whereby the rotation of shaft 20 may be utilized to produce rotation of worm 24, comprising a pin 26 extending through the shaft 20 and fitted therein and entering one of a pair of elongated slots 27 (only one being shown) formed in the elongated hub or sleeve 25. Other means, such as a cooperating spline and groove construction formed on the shaft and worm may of course be utilized if desired. Meshing with the worm 24 and driven thereby in a manner which will be set out in detail later is the worm wheel 24a mounted on a shaft 24b at right angles to the shaft 20.

A stationary profile cam surface 28 is formed on the end of the hollow cylinder 22, extends circumferentially about said end and is rotatably adjustable in the leg 21b by means of a rod 22a fastened to the hollow cylinder 22. A cam set screw 22b is threaded into the leg 21b in a position to impinge upon the hollow cylinder 22 whereby the cylinder carrying the cam 28 may be locked in any desired adjusted, rotative position. A cam follower 29 is formed on the end of the hub 25 adjacent to and in axial alinement with the hollow cylinder 22 and the cam surface 28 thereof.

Figure 2A:
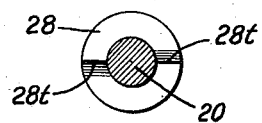
Fig. 2a is an end view of the cam element of Fig. 2.

An element 30, internally threaded and provided with a set screw 31, cooperates with a thread 20a formed on shaft 20. By varying the threaded axial position of element 30 and fastening set screw 31 at the adjusted position, the compression applied to a spring 32 may be adjustably varied. Spring 32 abuts element 30, at one end thereof, and a flange 33 on worm 34 at the other end thereof to thereby urge the cam follower 29 constantly against the cam 28. As illustrated in Fig. 2a, the cam 28 is constructed of a pair of gradually rising surfaces terminating, respectively, in a pair of step-off or transfer points 28t. The cooperating surface of the cam follower 29 is shown as similarly constructed so as to coincide completely throughout its extent with the surface of cam 28 immediately after the transfer point has been passed. While the cam and follower surfaces are illustrated as being similar in construction and while a pair of transfer points has been illustrated in Figs. 1, 2, and 2a, it is to be expressly understood that this construction is merely indicative of one of a variety of structures that may be utilized as will be explained in more detail in connection with Figs. 4 to 10b inclusive.

The operation of the device is as follows:

By means of the driving element 23 and the coordinating driving device therefor (not shown), shaft 20 is continuously rotated at the desired speed. This rotation of shaft 20 is transmitted to the worm 24 by means of the pin and slot connection 26, 27 whereby the worm 24 is continuously rotated at the same speed as shaft 20 but is free to move axially thereon. Upon rotation of the worm 24, the cam follower 29 rotates over the profile cam 28 thereby imparting to the worm 24 a motion of translation dependent upon the shapes of the cooperating cam and cam follower. The surfaces of the cam follower and the cam may be so designed that for a half rotation of the worm 24 in the direction as indicated by the arrow to advance the thread, the worm 24 is simultaneously moved axially to the right by the cooperating cam surfaces an amount just equal to one half the pitch of the thread on the worm wheel.

Since the motion transmitted to the left by the worm 24 is always equal to the apparent motion of the screw thread thereof to the left, and since the cooperating cam surfaces under the condition assumed move the worm 24 to the right an amount that is always equal to the apparent motion of the screw thread, no motion is transmitted to worm wheel 24a and the worm wheel and its driving shaft 24b remain stationary. When the cam surface and cam follower reach a transfer point such as 28t, however, the worm 24 is no longer held from movement to the left under the continuous urging of the spring 32, and the worm is thereby moved bodily to the left an amount equal to one half the pitch of the thread thereby imparting, an intermittent movement of rotation to the worm wheel 24a at each one half revolution of the worm 24. It should be noted that the force available to rotate gear 24a is derived from spring 32 and hence is dependent upon the strength and compression of that spring. By varying the axial position of element 30 on screw thread 20a, the compression of spring 32 and hence the force of the feed stroke may be adjusted. To minimize noise and wear, the strength and compression of spring 32 is preferably kept to a minimum consistent with the torque load on gear 24a.

The rotative position of the cam 28 may be adjusted by means of the lever or rod 22a and set screw 22b so that the occurrence of the intermittent movement may be adjusted to any desired position in the cycle.

Figure 2:
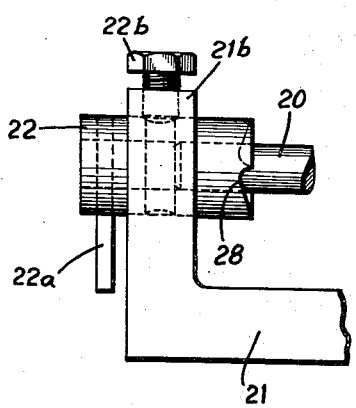
Fig. 2 is a fragmentary elevation illustrating separately a cam element of the device of Fig. 1 and the manner of mounting the same.
Figure 2B:
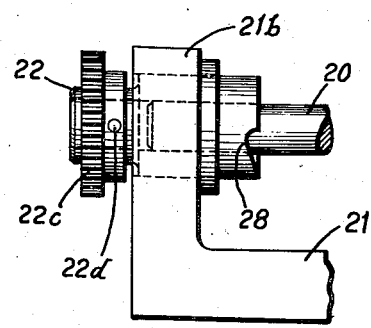
Fig. 2b is a fragmentary elevation illustrating a modification of the device of Fig. 2.

Referring to Fig. 2b, there is illustrated therein a modification of the device of Fig. 2 wherein the means for controlling the occurrence of the intermittent movement comprise a pinion 22c, replacing lever 22a of Fig. 2, this pinion being mounted on a reduced extension of cylinder 22 and fixed thereto by a taper pin 22d or other suitable means. Set screw 22b of Fig. 2 may also be omitted, since cylinder 22 may be continuously rotated upon rotation of pinion 22c by driving means (not shown) meshing therewith. Upon rotation of cylinder 22 while worm 24 is driven as above described, the transfer point is progressively advanced or retarded with respect to the rotation of worm 24. Upon rotation of cylinder 22 in the direction of rotation of worm 24, the transfer point is retarded while upon rotation in the reverse direction the transfer point is advanced. It is at once apparent, that by imparting a progressive movement of rotation to pinion 22c, continuous control of the transfer point and therefore of the occurrence of the intermittent movement can be obtained. Thus the intermittent rate can be increased or decreased independently of the speed of rotation of the driving means.

Referring to Figs. 3, 3a, and 3b, there is diagrammatically illustrated therein, the principle and method of operation of one embodiment of the invention which is generically of the type illustrated in Figs. 1, 2 and 2a. It is to be specifically understood, however, that the details of the cam and cam follower of Figs. 1, 2 and 2a can be modified to conform to any of the following described embodiments. Assuming that the worm has but a single thread and that the cam surface has a slope whose lead is equal to the lead of the worm but reversed with respect thereto and that the cam surface is provided with but a single step-off or transfer point $tp$, the surface of the cam element 28 of Fig. 1 will now be represented diagrammatically in development by 28a and the surface of the cam follower 29 of Fig. 1 by the surface 29a. The reference point or origin "O" (Fig. 3a) is assumed to be just less than 180° earlier. As illustrated in Fig. 3, the cam and cam follower surfaces are at the portion of the cycle at which transfer is just about to occur. In the graphic motional diagram (Fig. 3a), O—A represents that component of motion acting on wheel 24a (Fig. 1) which is due to the worm 24 while O—B represents the component due to the cam. The resultant motion is illustrated in Fig. 3b and is indicated by the irregular line $O_1$—$C_1$. Assuming, as illustrated in Fig. 1, that the cam is stationary, no motion of the worm wheel 24a occurs up to the transfer point, since the lead of the worm is exactly counterbalanced by the lead of the cam. When the step-off or transfer point of the cam is reached, the transfer spring 32 bodily moves the cam 24 and cam follower surface 29a to the left. The worm 24 therefore acts as a pawl and rotates the worm wheel 24a an amount in proportion to the pitch of the worm or one tooth pitch of the worm wheel 24a. Thereafter, the motional components are balanced through the 360° position as indicated in Fig. 3 and until the 180° position is again assumed whereupon the motion above described and as illustrated in Fig. 3b will be repeated. It is therefore seen that the velocity ratio of the worm and worm wheel is the same as in the case of a simple worm drive but that the drive motion is imparted in a very small fraction of a complete rotation. By adjusting the rotative position of the stationary cam, the transfer point can be advanced or retarded as desired.

Referring to Figs. 4, 4a, and 4b, there is illustrated therein a modification of the embodiment as illustrated in Figs. 3, 3a, and 3b whereby the transfer is brought about more gradually to thereby minimize shock and noise. With the exception of the fact that a gradual transfer arc $ta$ is utilized and a similar cooperating surface is formed on the follower instead of the sharp transfer point and cooperating surface on the follower of Figs. 3, 3a and 3b, the ensuing operation is generically the same as above described, the resultant motion being clearly illustrated in Fig. 4b.

Referring to Figs. 5, 5a and 5b, it is assumed in the embodiment illustrated therein that the worm 24 of Fig. 1 is provided with a double thread and that the cam surface 28 of Fig. 1 is replaced by a cam surface 28b provided with two step-off or transfer points 180° apart and the cam follower surface 29 of Fig. 1 is replaced by the cam follower surface 29b. Referring to the motion diagram (Fig. 5a), it is seen that the lead is double that of the embodiment of Figs. 3, 3a, and 3b. The worm wheel 24a, therefore, will be advanced one tooth pitch for every 180° of rotation of the worm 24 and it is seen therefore that the velocity ratio is again equal to that of an equivalent simple worm drive as in the embodiment of Figs. 3, 3a, and 3b. It is deemed obvious that any reasonable number of threads may be utilized with a corresponding number of transfer points on the cam to thereby obtain intermittence at any desired decimal or fractional part of a revolution.

Referring to Figs. 6, 6a, and 6b, the surface of cam 28 of Fig. 1 is replaced by the cam surface 28c and the surface of cam follower 29 of Fig. 1 by the cam follower surface of 29c. By the gradual sloping construction of the cooperating cam and follower surfaces as illustrated, the worm wheel 24a will be gradually advanced during one half a revolution and will remain stationary during the other half revolution as is illustrated in Fig. 6b.

Referring to Figs. 7, 7a, and 7b, there is illustrated therein, a novel construction of the cam and cam follower whereby an intermittent overdrive of the worm wheel 24a can be produced. Cam surface 28 of Fig. 1 is replaced by the cam surface 28d and the follower surface by surface 29d. These surfaces are so constructed that during one half a revolution of the worm 24, the slope of the effective cooperating cam surface has a lead equal to and in the same direction as the pitch of the worm 24 so that the worm wheel 24a is advanced one tooth pitch by the rotation of the worm 24 acting as a worm and one tooth pitch in addition by the rack action of the worm 24 moving bodily, which last motion is produced by the construction of the cooperating cam and follower surfaces. During the second half revolution, however, the effective cooperating cam surface is so constructed as to have a pitch which is twice the pitch of the worm 24 and opposite thereto so that the worm 24 is driven bodily backwardly an amount equal to twice the pitch by means of the cooperating cam surfaces and thereby acts as a ratchet to retract the worm wheel 24a one tooth pitch during this half revolution. An intermittent overdrive is therefore imparted to the worm wheel 24a by means of the continuous rotation of worm 24 and the particular construction of the cooperating surfaces 28d and 29d, as is clearly illustrated in Fig. 7b.

Referring to Figs. 8, 8a, and 8b, there is illustrated therein a device which is of the same construction as the embodiment of Figs. 7, 7a, and 7b. By adjustment of the rod or lever 22a and the set screw 22b of Fig. 1, however, the phase of the cycle of rotation may be altered so that the worm wheel 24a is retracted one tooth pitch during the first half revolution of the worm 24 and the worm wheel is advanced two pitches during the second half revolution. This thereby imparts to the worm wheel 24a an intermittent underdrive, as is illustrated in Fig. 8b. By means of the structure of Figs. 7, 7a, and 7b, therefore, and the adjustable elements 22a, and 22b of Fig. 1, it is seen that both the movements as illustrated in Figs. 7b and 8b may be produced.

Referring to Figs. 9, 9a, and 9b, there is illustrated therein an embodiment of the invention wherein the cam follower surface 29 of Fig. 1 is replaced by a surface 29e which is not symmetrical with respect to a stationary or profile cam surface represented by 28e. The cam follower surface contact point, $cp$ is generally semicircular in outline so that the rounded point comprising the cam follower contact point follows the surface of the cam with a gradual or rounded out motion at the transfer points. The profile cam surface 28e may of course also be rounded out at the transfer point to thereby increase the smoothness of operation. In the embodiment as illustrated in Figs. 9, 9a and 9b, the cam surface is so varied that worm wheel 24a is gradually advanced one tooth pitch during the first quarter of a revolution but is held stationary during the remaining three quarters of a revolution as is clearly illustrated in Fig. 9b.

Referring to Figs. 10, 10a, and 10b, there is illustrated therein a construction which is generically similar in construction to the embodiment of Figs. 9a and 9b. The cam follower surface 29f is of the same construction as 29e of Fig. 9 but the profile cam 28f has its slope so varied as to produce a more irregular resultant motion. By the utilization of the simple semi-circular contact point of the follower 29f, secondary interference, which would occur if the follower and cam were of similar shape, is eliminated and the cam follower will follow the profile cam 28f as exactly as desired so that every variant of motion is produced exactly in accordance to the changes in slope of the surface 28f. The type of motion ensuing in the worm wheel 24a is illustrated in Fig. 10b which thereby clearly illustrates the wide variety of intermittent movement that can be produced by variation of the construction of the cam and cam follower contours in conjunction with the novel means of the present invention.

Novel means are therefore provided whereby a positive intermittent drive is produced employing driving surfaces which are in continuous engagement to thereby eliminate overthrow, provide great versatility with respect to the motional cycle and produce overdrive or underdrive if desired.

While there has been shown and described and pointed out the fundamental novel features of the invention as applied to a single modification it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. Intermittent motion producing means comprising a rotatable shaft, means for rotating said shaft, a collar on said shaft, a worm mounted on said shaft, a spring compressed between said collar and said worm, means connecting said worm to said shaft for rotation therewith, means permitting relative axial movement of said shaft and worm, a cam follower on the end of said worm, cam means mounted for adjustable rotative movement cooperating with said follower, and means for adjustably fixing the rotated position of said cam.

2. Intermittent motion producing means comprising a rotatable shaft, a worm, a slot in said worm, means on said shaft projecting into said slot, a cam follower on the end of said worm, cam means cooperating with said follower including a hollow cylinder coaxial with said shaft, means mounting said cylinder for rotatable adjustment about said shaft axis, resilient means urging said worm along said shaft to produce contact between said cam follower and said cam means, and a worm wheel engaging said worm for rotation thereby.

3. Intermittent motion producing means comprising a worm, means mounting said worm for rotation and motion of translation axially thereof, cam follower means on the end of said worm, and cam means cooperating therewith including a hollow cylinder, a cam surface formed on the end circumference of said cylinder, means mounting said cylinder coaxially with said worm for rotatable adjustment about the axis of said worm, a lever attached to said cylinder for adjusting the rotatable position thereof, and lock means for locking said cylinder in its adjusted position.

4. Intermittent motion producing mechanism comprising a continuously rotating worm mounted for movement axially thereof, a cam follower on the end of said worm, and cam means cooperating with said follower and including a circumferentially extending surface, one part of said surface having a sloping contour whose lead is equal to and in the same direction as the lead of said worm and another part thereof having a contour whose lead is equal to twice the lead of said worm and opposite thereto, and means for adjustably setting the rotative position of said cam to thereby produce overdrive or underdrive at a predetermined portion of a cycle of revolution of said worm.

5. Intermittent motion producing mechanism comprising a continuously rotating worm mounted for movement axially thereof, a rounded point cam follower carried by said worm, and cam means cooperating therewith and including a circumferentially extending surface, one portion of said surface having a contour sloping in one direction and an adjacent portion sharply sloping away from said first portion.

6. In a device of the character described, a continuously rotating worm, a cam follower formed on said worm, cam means cooperating with said follower, a worm wheel engaging said worm for rotation thereby, means resiliently urging said cam means and follower into contact with each other and means for adjustably varying the force of said resilient means to thereby vary the rotative force applied to said worm wheel.

7. Intermittent motion producing means comprising a rotatable shaft, a worm, means mounting said worm for rotation with and translation with respect to said shaft, cam follower means on said shaft, resilient means for locating said worm axially of said shaft and means for adjustably varying the compression of said resilient means.

8. Intermittent motion producing means comprising a rotatable shaft, a worm, means mounting said worm for rotation with and translation with respect to said shaft, cam follower means on said shaft, cam means, rotatively mounted, cooperating with said follower, and means for continuously adjusting the rotative position of said cam means with respect to said follower.

9. A device for positively changing motion of rotation to intermittent motion, comprising a worm, means continuously rotating said worm, cam means operative to move said worm axially during said rotation, and means for continuously controlling the cyclic position of said cam means.

HARRY J. NICHOLS.